United States Patent Office 2,724,720
Patented Nov. 22, 1955

2,724,720

DICARBAMATES OF SUBSTITUTED PROPANE DIOLS

Frank M. Berger, Princeton, and Bernard J. Ludwig, New Brunswick, N. J., assignors to Carter Products, Inc., New York, N. Y., a corporation of Maryland No Drawing. Application August 3, 1953,
Serial No. 372,144

4 Claims. (Cl. 260—482)

This invention relates to organic compounds and has for its object the provision of certain new compounds which have effective central depressant properties. The invention is based on our discovery that in the class of 2,2-disubstituted-1,3-propanediol dicarbamates three compounds possess marked anti-convulsant and other properties. The three compounds are:

2-methyl-2-isopropyl-1,3-propanediol dicarbamate
2-ethyl-2-phenyl-1,3-propanediol dicarbamate
2-methyl-2-n-propyl-1,3-propanediol dicarbamate These 2,2-disubstituted-1,3-propanediol dicarbamates are white crystalline solids soluble in most organic solvents but soluble to only a slight degree in water. They form stable solutions in water, and upon boiling with acid or alkali hydrolyze to give the corresponding 2,2-disubstituted-1,3-propanediol, ammonia and carbon dioxide.

These three compounds not only possess anti-convulsant properties of much greater intensity than other related compounds but they produce an action of much longer duration. For example, when these compounds have been injected into animals, they afford protection from electroshock seizures for several hours.

When the compounds of the invention are tested in suitable experimental animals, such as mice, for their ability to prevent the occurrence of electroshock seizures, it is found that they have a protective action of longer duration than the diols from which they are derived. In these test, first a strength of current was determined which, when administered through corneal electrodes, would produce a typical electro-convulsive seizure on all mice. It was found that a current strength of about 12 milliamperes applied for 0.2 second would effect this.

The tests themselves were carried out with a current strength of 50 milliamperes, that is, approximately 4 times the minimum effective dose. The apparatus used was arranged in such a way that the current administered was independent of external resistance. The various compounds were given to the mice at graded dose levels by the oral route and the dose protecting 50% of the animals from electroshock seizures was determined by the customary methods of calculation.

Table I gives these mean protective doses of the compounds of the invention and the diols from which they are derived to prevent electroshock seizures in mice 30 minutes and 150 minutes after administration of the compounds. The mean protective doses are expressed in millimoles per kilo of animal weight and the standard error of the dose is also given.

Table I

| Compound | Time, Mins. | $R_1$ methyl $R_2$ n-propyl | $R_1$ methyl $R_2$ iso-propyl | $R_1$ ethyl $R_2$ phenyl |
|---|---|---|---|---|
| Diol<br>$X_1CH_2OH$<br>$X_2CH_2OH$ | 30 | 2.0 ±0.1 | 3.2±0.28 | 1.2 ±0.04 |
|  | 150 | Ineffective | Ineffective | Ineffective |
| Dicarbamate<br>$X_1CH_2OCONH_2$<br>$X_2CH_2OCONH_2$ | 30 | 0.76±0.04 | 1.5±0.09 | 1.5 ±0.15 |
|  | 150 | 1.4 ±0.04 | 2.6±0.17 | 1.67±0.08 |

These results show conclusively that these carbamates are distinctly superior to their parent compounds in possessing action of longer duration. This can be shown when animals given different doses of anti-convulsants are subjected to electroshock at different times after administration of the drug. In each case the diol compounds while fully effective in protecting animals 30 minutes after administration are completely ineffective 150 minutes after administration. The dicarbamate derivatives of these compounds, on the other hand, are distinctly effective in protecting animals from electroshock seizures even 150 minutes after administration.

The compound 2-methyl-2-n-propyl-1,3-propanediol dicarbamate not only has exceptional anti-convulsant properties but it also has when given in suitable dosage a marked paralyzing action on voluntary muscles. This paralyzing action manifests itself in animals in their complete inability to move. Animals paralyzed in this manner remain conscious and all their vital functions, such as respiration and heart action, continue in an unimpaired manner. An important characteristic of the compound is that the animals recover from the paralysis without any ill effects.

Pharmacological studies have shown that paralysis is produced by a depressant effect on the central nervous system. The nerves and nerve endings remain unaffected by the drug. The structure most sensitive to the effect of the drugs in the central nervous system are the interneurons. This may be of therapeutic value. The action of this compound is similar to that of mephenesin in numerous respects, but differs from it in possessing a very much longer duration of action, and in being somewhat more effective on oral administration. Mephenesin is a widely used drug of value in the treatment of muscle spasm, anxiety and many disorders of the nervous system. The very short duration of action of mephenesin is its greatest drawback. The duration of the action of mephenesin was compared with 2-methyl-2-n-propyl propanediol dicarbamate in the series of tests recorded in Table II.

Table II

| Dose, Mgm. per Kgm. | Mephenesin | | 2-Methyl-2-n-Propyl-1,3-Propanediol Dicarbamate | |
|---|---|---|---|---|
| | Percent Paralyzed | Duration of Paralysis in Minutes | Percent Paralyzed | Duration of Paralysis in Minutes |
| 1,400 | 100 | 113.0±14.5 | 100 | 420 |
| 940 | 100 | 57.4±10.4 | 100 | 317.2±42.0 |
| 620 | 80 | 19.2± 2.0 | 100 | 182.1±24.8 |
| 420 | 50 | 11.0± 2.0 | 100 | 90.0±16.9 |
| 280 | 10 | 4.5 | 20 | 82.2 |

It will be noted that at the various dose levels at which the comparison was carried out the action of this compound of the invention was five to ten times as long as that of mephenesin. The action of the other two compounds, namely the 2-methyl-2-isopropyl-1,3-propanediol dicarbamate and 2-ethyl-2-phenyl-1,3-propanediol dicarbamate, is similar to the above mentioned compound but is not as intense. When the diols from which these dicarbamates are derived were investigated in a similar manner, it was found that they had only weak paralyzing action, the duration of which was even shorter than that of mephenesin.

The preparation of these new organic compounds involves the reaction of the selected 2,2-disubstituted-1,3-propanediol with phosgene to form the corresponding dichlorocarbonate derivative. This reaction is advantageously promoted by the addition to the reacting compounds of any suitable acid-combining compound such as sodium hydroxide, antipyrine, dialkylaniline, and the like. This step in the method is followed by ammoniation of the dichlorocarbonate derivative to form the desired dicarbamate, using anhydrous ammonia or aqueous ammonium hydroxide as suitable sources of ammonia for this purpose. The following examples serve to illustrate the method of preparation of the 2,2-disubstituted-1,3-propanediol dicarbamates of our invention.

*Example 1*

To a solution of 100 parts by weight of phosgene in 900 parts of anhydrous toluene there is added gradually with stirring 66 parts of 2-methyl-2-isopropyl-1,3-propanediol. The reaction mixture is stirred until a clear solution is obtained. While cooling the reaction vessel so that the temperature is maintained at about room temperature 380 parts of antipyrine dissolved in a minimum volume of chloroform are added gradually to promote the reaction between phosgene and the diol. Formation and separation of the hydrochloride of antipyrine takes place rapidly and the reaction mixture is stirred until the reaction is complete.

The solid antipyrine hydrochloride is removed by filtration and the filtrate saturated with anhydrous ammonia, while stirring and cooling the reaction vessel. The solid formed during this ammoniation is removed by filtration, dried and extracted with cold water, leaving a residue of crude reaction product. It is purified by recrystallization from hot water. The purified 2-methyl-2-isopropyl-1,3-propanediol dicarbamate is obtained in 60% yield as a white crystalline solid, M. P. 99–100°, soluble in water to the extent of about 0.15% at 27° C.

Analysis of this compound gave: N, 12.6%. Calculated for $C_9H_{18}N_2O_4$: N, 12.8%.

*Example 2*

100 parts phosgene dissolved in 500 parts benzene, 90 parts 2-ethyl-2-phenyl-1,3-propanediol and 190 parts antipyrine dissolved in a minimum volume of chloroform are reacted together as described in Example 1. The solid antipyrine hydrochloride is removed by filtration and the filtrate is poured gradually into a well stirred cooled solution of an excess of ammonium hydroxide. The reaction product separates in the form of a semi-solid and is removed by filtration. The crude dicarbamate is dried and purified by recrystallization from hot benzol. 2-ethyl-2-phenyl-1,3-propanediol dicarbamate is obtained in 70% yield as a white crystalline solid, M. P. 119–120°; slightly soluble in water at ordinary room temperature. Analysis of this compound gave: N, 10.3%. Calculated for $C_{13}H_{18}N_2O_4$: N, 10.5%.

*Example 3*

A solution containing 52.8 parts of 2-methyl-2-n-propyl-1,3-propanediol and 128 parts of acetone is added with stirring to 112 parts of liquid phosgene at such a rate that the temperature of the reaction is maintained at −5° to 0° C. The reaction is stirred one hour at about 0° then cooled to −15°. A cooled 30% solution of 32 parts of sodium hydroxide is added with stirring to the reaction at such a rate that the temperature is maintained at −15 to −5°. The mixture is stirred for an additional ½ hour at about 0° then cooled to −20°. 180 parts of cooled ammonium hydroxide solution (28.6% $NH_3$) are added while cooling and with stirring at such a rate that the temperature rises slowly to 20° and stirring is continued for an additional ½ hour. The mixture is poured with agitation into 1700 parts of ice water. The solid which separates is removed by filtration and dried. Recrystallization from water gives 55 parts (63% of theoretical yield) of 2-methyl-2-n-propyl-1,3-propanediol dicarbamate, M. P. 104–105°; approximately 0.2% soluble in water at ordinary room temperature. Analysis of this compound gave: N, 12.5%. Calculated for $C_9H_{18}N_2O_4$:N, 12.8%.

All temperatures herein are in ° C.

This application is a continuation-in-part of our copending application Serial Number 176,764, filed July 29, 1950, and now abandoned.

We claim:

1. The 2,2-disubstituted 1,3-propanediol dicarbamates of the group consisting of 2-methyl-2-isopropyl-1,3-propanediol dicarbamate, 2-ethyl-2-phenyl-1,3-propanediol dicarbamate, and 2-methyl-2-n-propyl-1,3-propanediol dicarbamate.

2. 2-methyl-2-isopropyl-1,3-propanediol dicarbamate.

3. 2-ethyl-2-phenyl-1,3-propanediol dicarbamate.

4. 2-methyl-2-n-propyl-1,3-propanediol dicarbamate.

References Cited in the file of this patent

FOREIGN PATENTS 614,295   Great Britain _____ Dec. 13, 1948

OTHER REFERENCES

Adkins et al., J. Am. Chem. Soc. v. 70 (1948) 3121–5.

Berger, Proc. Soc. Exptl. Biol. Med. 71 (1949) 270–271.

Berger, C. A. 46, 5716 (1952).